United States Patent
Wada et al.

(10) Patent No.: US 12,070,684 B2
(45) Date of Patent: Aug. 27, 2024

(54) INFORMATION PROCESSING APPARATUS AND PLAY FIELD DEVIATION DETECTING METHOD

(71) Applicant: Sony Interactive Entertainment Inc., Tokyo (JP)

(72) Inventors: Shinya Wada, Kanagawa (JP); Takayuki Ishida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 421 days.

(21) Appl. No.: 17/270,903

(22) PCT Filed: Sep. 4, 2018

(86) PCT No.: PCT/JP2018/032767
§ 371 (c)(1),
(2) Date: Feb. 24, 2021

(87) PCT Pub. No.: WO2020/049638
PCT Pub. Date: Mar. 12, 2020

(65) Prior Publication Data
US 2021/0178265 A1    Jun. 17, 2021

(51) Int. Cl.
*A63F 13/537* (2014.01)
*A63F 13/213* (2014.01)
(Continued)

(52) U.S. Cl.
CPC .......... *A63F 13/537* (2014.09); *A63F 13/213* (2014.09); *G06T 7/13* (2017.01);
(Continued)

(58) Field of Classification Search
None
See application file for complete search history.

(56) References Cited

U.S. PATENT DOCUMENTS 9,025,027 B2 *  5/2015  Xue .......................... G08G 1/16
                                                          348/148
9,599,818 B2    3/2017  Yamagishi
(Continued)

FOREIGN PATENT DOCUMENTS

EP        2674893 A2    12/2013
JP      2011150688 A     8/2011
(Continued)

OTHER PUBLICATIONS

International Preliminary Report on Patentability and Written Opinion for corresponding PCT Application No. PCT/JP2018/032767, 15 pages, dated Mar. 18, 2021.
(Continued)

*Primary Examiner* — Seng H Lim
(74) *Attorney, Agent, or Firm* — Matthew B. Dernier, Esq.

(57) ABSTRACT

An image obtaining section of an information processing apparatus obtains polarized light images in a plurality of directions from an imaging device provided to a moving body. A polarization degree obtaining section of an image analyzing section obtains a degree of polarization on the basis of direction dependence of luminance of polarized light. A high polarization degree region evaluating section detects the peripheral edge of a play field on which the moving body is present, by evaluating the shape of a high polarization degree region having degrees of polarization higher than a threshold value in a state in which the high polarization degree region is overlooked. An output data generating section generates and outputs output data for avoiding movement to the peripheral edge.

8 Claims, 11 Drawing Sheets

(51) Int. Cl.
*G06T 7/13* (2017.01)
*G06T 7/514* (2017.01)
*G06T 11/00* (2006.01)
*G06V 20/20* (2022.01)

(52) U.S. Cl.
CPC .............. *G06T 7/514* (2017.01); *G06T 11/00* (2013.01); *G06V 20/20* (2022.01); *G06T 2200/24* (2013.01)

(56) References Cited

U.S. PATENT DOCUMENTS

| | | | |
|---|---|---|---|
| 9,630,105 B2 | 4/2017 | Stafford | |
| 10,769,951 B2 | 9/2020 | Hirasawa | |
| 10,789,569 B1* | 9/2020 | Anor | G06F 18/211 |
| 2012/0069181 A1* | 3/2012 | Xue | G01J 3/447 |
| | | | 348/241 |
| 2012/0242835 A1* | 9/2012 | Li | G08G 1/167 |
| | | | 382/104 |
| 2013/0058528 A1* | 3/2013 | Liu | G06V 20/588 |
| | | | 382/103 |
| 2013/0136306 A1* | 5/2013 | Li | G06V 20/58 |
| | | | 382/103 |
| 2013/0328928 A1 | 12/2013 | Yamagishi | |
| 2015/0094142 A1 | 4/2015 | Stafford | |
| 2016/0267348 A1* | 9/2016 | Kondo | G06V 10/462 |
| 2016/0307053 A1* | 10/2016 | Aycock | G08G 9/02 |
| 2018/0005012 A1* | 1/2018 | Aycock | G01J 4/04 |
| 2018/0301032 A1 | 10/2018 | Hirasawa | |
| 2018/0361240 A1 | 12/2018 | Ikenoue | |
| 2020/0184233 A1* | 6/2020 | Berberian | G06V 20/588 |
| 2023/0062698 A1* | 3/2023 | Engel | G01N 15/1468 |

FOREIGN PATENT DOCUMENTS

| | | |
|---|---|---|
| JP | 2014016981 A | 1/2014 |
| JP | 5580855 B2 | 8/2014 |
| JP | 2017130793 A | 7/2017 |
| JP | 2018099523 A | 6/2018 |
| WO | 2017056822 A1 | 4/2017 |

OTHER PUBLICATIONS

International Search Report for corresponding PCT Application No. PCT/JP2018/032767, 4 pages, dated Oct. 30, 2018.

* cited by examiner

INFORMATION PROCESSING APPARATUS AND PLAY FIELD DEVIATION DETECTING METHOD

TECHNICAL FIELD

The present invention relates to an information processing apparatus and a play field deviation detecting method that detect deviation of a moving body from a play field beforehand.

BACKGROUND ART

Known are technologies in which a head-mounted display is mounted on a head to play a game while watching a displayed screen or view electronic content (see PTL 1, for example). Of these technologies, also spreading is a technology which realizes augmented reality or virtual reality by providing an imaging device in front of the head-mounted display and replacing a part of an image photographed in a field of view corresponding to the direction of the face of a user with a virtual object or representing a virtual world in the corresponding field of view. In addition, also known is a technology which makes a robot move safely or perform a target operation flexibly by providing the robot with an imaging device and making the robot recognize objects present in surroundings, and thereby creating an environment map.

CITATION LIST

Patent Literature

[PTL 1] Japanese Patent No. 5580855

SUMMARY

Technical Problems

In a state of wearing the head-mounted display, the user cannot see the outside. Thus, the user may lose a sense of direction or move to an unexpected position in a real space because the user is too immersed in the game. Such conditions are difficult for the user to recognize unless the user takes off the head-mounted display. In addition, also in the case where the robot is provided with an imaging device, the robot may move to an unexpected direction due to erroneous recognition of surrounding objects and conditions. In either case, there is a danger that the user or the robot collides with a wall or an obstacle or makes a false step at a level difference of the ground.

The present invention has been made in view of such problems. It is an object of the present invention to provide a technology that can suitably control the moving range of a moving body such as a robot or a user wearing a head-mounted display.

Solution to Problems

An aspect of the present invention relates to an information processing apparatus. This information processing apparatus includes an image obtaining section configured to obtain data of polarized light images in a plurality of directions, the polarized light images being photographed by an imaging device provided to a moving body; a polarization degree obtaining section configured to obtain distribution of degrees of polarization by using the polarized light images; a high polarization degree region evaluating section configured to detect a peripheral edge of a play field on which the moving body is present, by evaluating a shape of a high polarization degree region having degrees of polarization higher than a threshold value in a state in which the high polarization degree region is overlooked from directly above the moving body; and an output data generating section configured to generate and output output data for avoiding movement to the peripheral edge.

Yet another aspect of the present invention relates to a play field deviation detecting method. This play field deviation detecting method performed by an information processing apparatus includes a step of obtaining data of polarized light images in a plurality of directions, the polarized light images being photographed by an imaging device provided to a moving body; a step of obtaining distribution of degrees of polarization by using the polarized light images; a step of detecting a peripheral edge of a play field on which the moving body is present, by evaluating a shape of a high polarization degree region having degrees of polarization higher than a threshold value in a state in which the high polarization degree region is overlooked from directly above the moving body; and a step of generating and outputting output data for avoiding movement to the peripheral edge.

It is to be noted that any combinations of the above constituent elements and modes obtained by converting expressions of the present invention between a method, a device, and the like are also effective as modes of the present invention.

Advantageous Effect of Invention

According to the present invention, it is possible to suitably control the moving range of a moving body such as a robot or a user wearing a head-mounted display.

DESCRIPTION OF EMBODIMENT

Figure 1:
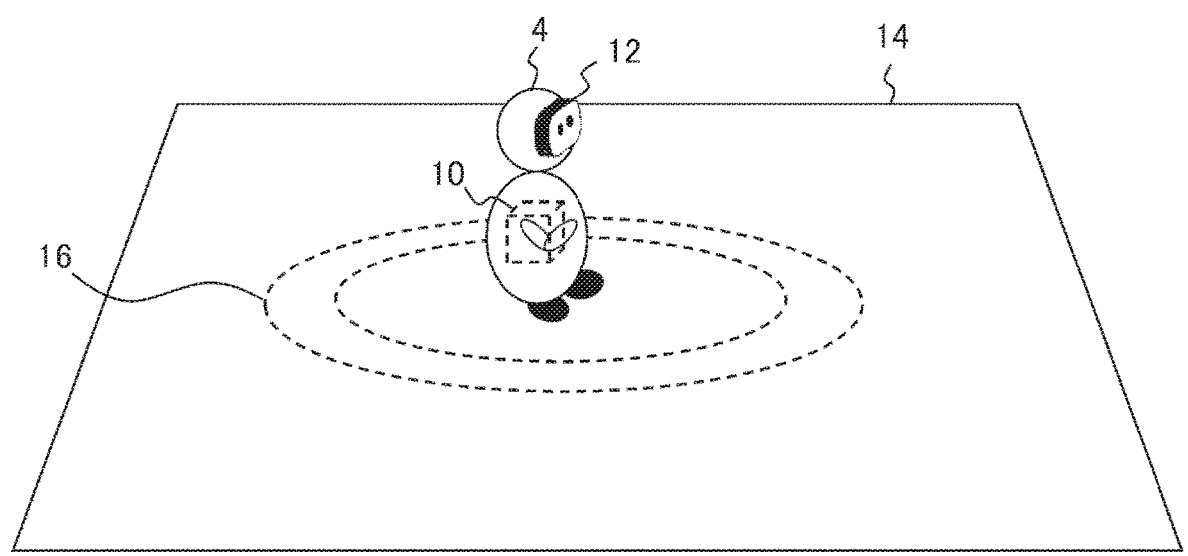
FIG. 1 is a diagram illustrating an example of a configuration of an information processing system in a present embodiment.

FIG. 1 depicts an example of a configuration of an information processing system in a present embodiment. The example depicted in the figure assumes that a robot 4 equipped with an imaging device 12 moves. An information processing apparatus 10 that analyzes a photographed image and determines the moving direction and operation of the robot 4 is included inside the robot 4. The information processing apparatus 10 may also be a device that externally performs remote control of the robot 4. Alternatively, a user may perform remote operation of the robot 4 by using an input device not illustrated, and the information processing apparatus 10 may assist so that an appropriate user operation is performed according to ambient conditions, by displaying a result of analyzing the photographed image on a display device not illustrated. Incidentally, the shape and function of the robot 4 are not particularly limited as long as a mechanism capable of moving in an autonomous manner or in line with an external operation and the imaging device 12 are provided.

On the other hand, there may also be a mode in which, instead of the robot 4, the user wears a head-mounted display including the imaging device 12. In this case, the information processing apparatus 10 may be included in the head-mounted display, or may be an external device capable of communicating with the head-mounted display by radio or wire. In this case, the information processing apparatus 10 may generate a display image corresponding to a line of sight of the user, on the basis of the photographed image, and display the display image on the head-mounted display. At least a part of the display image may be an image photographed by the imaging device 12.

Hence, information to be output from the information processing apparatus 10 may be a control signal to the robot 4, or may be an image to be displayed on the head-mounted display, an audio signal to be output, or the like. The information to be output from the information processing apparatus 10 can change depending on the mode to be implemented. The present embodiment aims at safely moving a moving body such as the robot 4 or the user within a predetermined play field 14. Hereinafter, the moving body will be described mainly as the robot 4. However, the robot 4 can be replaced with the user wearing the head-mounted display.

The play field 14 represents a movable range in which the robot 4 can move safely. Basically, set as the play field 14 is a planar region in which a slope or a level difference where the robot 4 may lose balance and fall or a height difference where the robot 4 may drop is not present. A table, a floor, a ground, and the like may be the play field 14, and the peripheral edge of the play field 14 is defined by a boundary at which the planar shape disappears, such as an edge of the table, a wall or a staircase continuous with the floor, or a pit in or an inclination of the ground. Hence, the shape and size of the play field 14 are not limited.

The information processing apparatus 10 detects that the robot 4 is about to deviate from the play field 14 by movement, by using a polarized light image photographed by the imaging device 12. Then, when the robot 4 is about to deviate, the information processing apparatus 10 controls the robot 4 so as to avoid the deviation. For this purpose, the information processing apparatus 10 obtains distribution of degrees of polarization on a moving surface by using polarized light images in a plurality of directions which images are photographed by the imaging device 12. Then, whether or not the peripheral edge of the play field 14 is present in the vicinity is determined on the basis of the shape of a region in which degrees of polarization higher than a predetermined threshold value are obtained (for example, a region 16).

Figure 2:
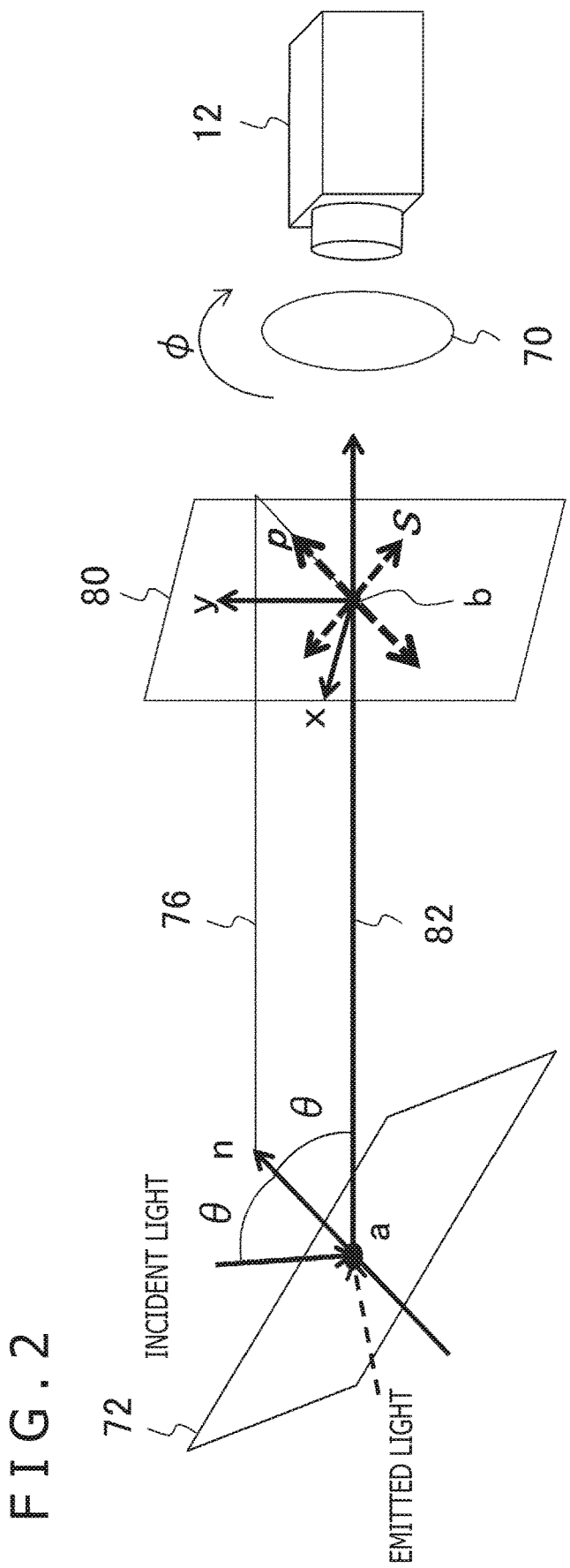
FIG. 2 is a diagram of assistance in explaining basic characteristics of polarized light used in the present embodiment.

FIG. 2 is a diagram of assistance in explaining basic characteristics of polarized light used in the present embodiment. The imaging device 12 photographs a space including a subject 72 via a linear polarizing plate 70. More specifically, the imaging device 12 observes polarized light vibrating in a direction determined by the linear polarizing plate 70 in reflected light including a specular reflection component formed by reflecting light applied from a light source from the subject 72 and a diffuse reflection component formed by emitting light scattered within the subject 72 from a surface thereof. A plane including a normal vector n at an observation point "a" in the surface of the subject 72 and a light ray 82 arriving at an image forming point "b" on an image plane 80 from the point "a" will be referred to as an incidence plane 76 at the observation point a.

The linear polarizing plate 70 transmits only linearly polarized light vibrating in a certain direction in the light ray 82. The vibration direction of the transmitted polarized light will hereinafter be referred to as a transmission axis of the linear polarizing plate 70. The transmission axis can be set in any direction when the linear polarizing plate 70 is rotated about an axis perpendicular to a surface thereof. If light arriving at the imaging device 12 is unpolarized light, observed luminance is constant even when the linear polarizing plate 70 is rotated. On the other hand, because ordinary reflected light is partially polarized light, the observed luminance changes with respect to the direction of the transmission axis. In addition, a manner in which the luminance changes differs depending on a ratio between specular reflection and diffuse reflection and an angle of incidence.

That is, specularly reflected light includes a high proportion of s-polarized light vibrating in a direction perpendicular to the incidence plane 76, and diffusely reflected light includes a high proportion of p-polarized light vibrating in a direction parallel with the incidence plane 76. However, each proportion depends on the angle of incident light (or emitted light) at the observation point "a." In any event, when the specularly reflected light is dominant, the observed luminance is at a maximum in a state in which the transmission axis of the linear polarizing plate 70 is perpendicular to the incidence plane 76, and the observed luminance is at a minimum in a state in which the transmission axis is parallel with the incidence plane.

When the diffusely reflected light is dominant, the observed luminance is at a maximum in a state in which the transmission axis of the linear polarizing plate 70 is parallel with the incidence plane, and the observed luminance is at a minimum in a state in which the transmission axis is perpendicular to the incidence plane. Hence, changes in polarized light luminance at the image forming point "b" which changes are obtained by photographing polarized light images in various directions of the transmission axis include information regarding the angle of the incidence plane 76 and the angle of the incident light (or the emitted light), and in turn include information regarding the normal vector n. Here, an angle θ formed between the normal vector n and the light ray 82 is referred to as a zenith angle of the normal vector n.

Figure 3:
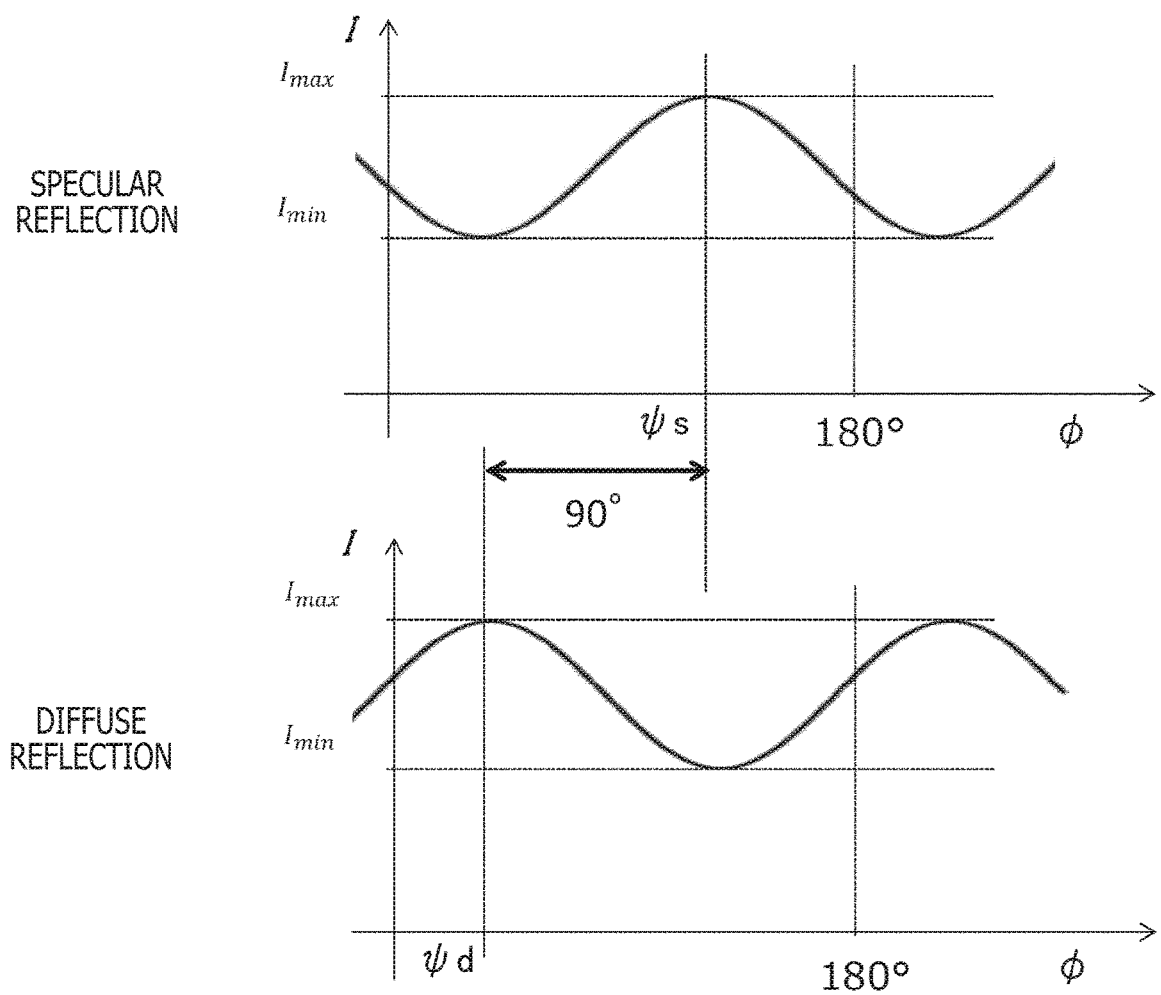
FIG. 3 is a diagram illustrating changes in luminance with respect to a polarization direction in the present embodiment.

FIG. 3 illustrates changes in luminance I with respect to a polarization direction y corresponding to the angle of the transmission axis. An upper part in the figure represents a case where specular reflection is dominant, and a lower part represents a case where diffuse reflection is dominant. Both the specular reflection and the diffuse reflection have the shape of a sine wave in a cycle of 180°. On the other hand, there is a difference of 90° between a polarization direction ψs when the luminance I of the specular reflection assumes a maximum value $I_{max}$ and a polarization direction ψd when the luminance I of the diffuse reflection assumes a maximum value $I_{max}$. This is due to the fact that s-polarized light is dominant in the specular reflection and p-polarized light is dominant in the diffuse reflection, as described above.

In view of the fact that the s-polarized light is vibration perpendicular to the incidence plane and the p-polarized light is vibration parallel with the incidence plane, a polarization direction (ψs−90°) in which the luminance is at a minimum in the specular reflection or the polarization direction ψd in which the luminance is at a maximum in the diffuse reflection represents the angle of the incidence plane. The normal vector n is always included in the incidence plane. Thus, the angle represents the angle of a vector obtained by projecting the normal vector n onto the photographed image plane. This angle is generally referred to as an azimuth angle of the normal vector n. The normal vector in a three-dimensional space as viewed from the imaging device 12 is uniquely determined by obtaining the zenith angle described above in addition to the azimuth angle. A polarization direction when the luminance of the observed polarized light is at a maximum is referred to as a phase angle ψ. Changes in the luminance I illustrated in FIG. 3 can be expressed by the following equation using the phase angle ψ.

[Math. 1]

$$I = \frac{I_{max}+I_{min}}{2} + \frac{I_{max}-I_{min}}{2}\cos(2\phi - 2\psi) \quad \text{(Equation 1)}$$

By approximating the luminance observed in a plurality of polarization directions y while the linear polarizing plate 70 is rotated in the form of Equation 1 with use of a least-square method or the like, $I_{max}$, $I_{min}$, and ψ can be obtained. A degree of polarization ρ is obtained by the following equation using $I_{max}$ and $I_{min}$ among $I_{max}$, $I_{min}$, and ψ.

[Math. 2]

$$\rho = \frac{I_{max} - I_{min}}{I_{max} + I_{min}} \quad \text{(Equation 2)}$$

Figure 4:
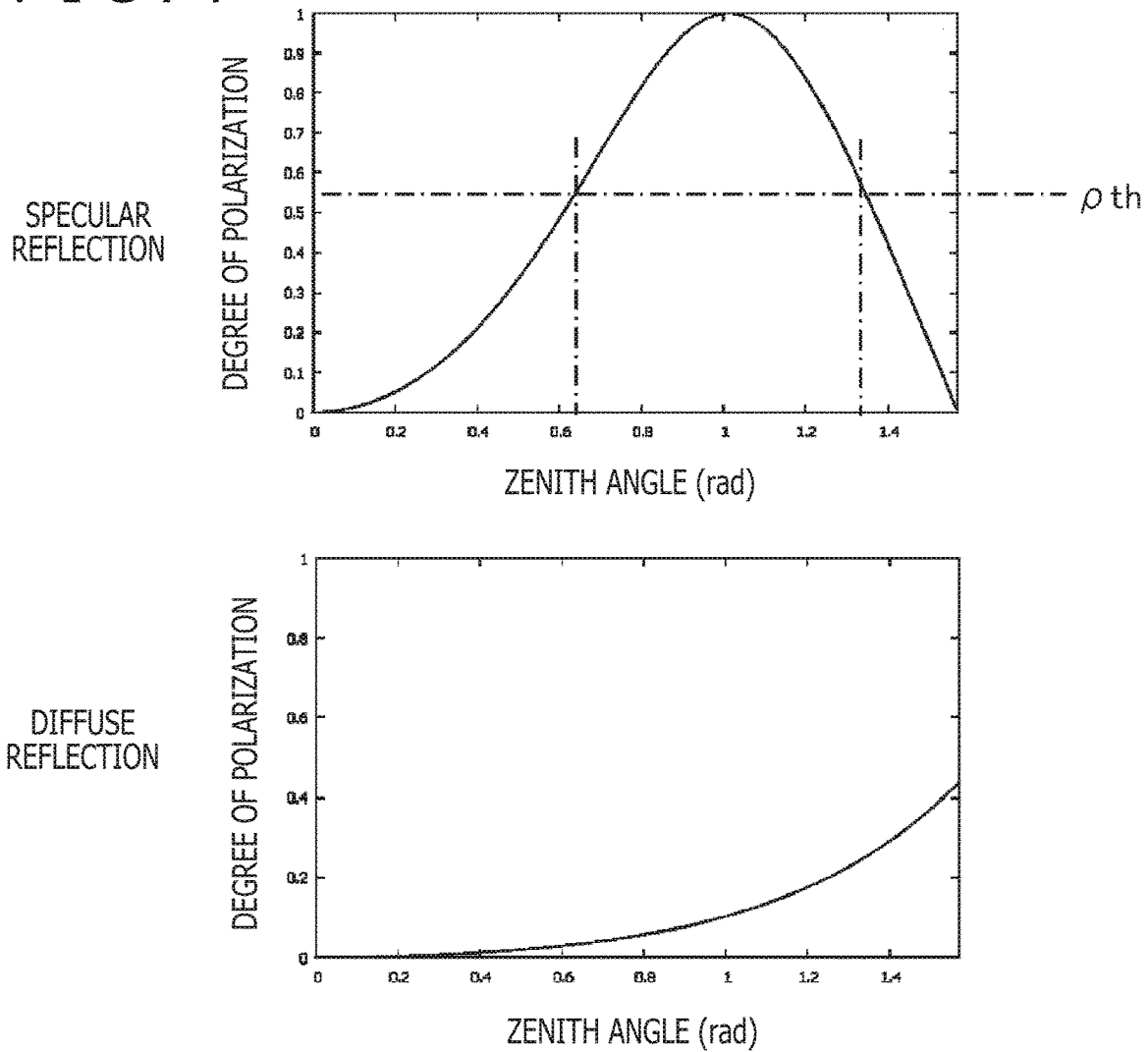
FIG. 4 is a diagram comparing examples of changes in a degree of polarization with respect to a zenith angle of a normal vector between specular reflection and diffuse reflection.

FIG. 4 compares examples of changes in the degree of polarization with respect to the zenith angle of the normal vector between the specular reflection and the diffuse reflection. In the case of the specular reflection illustrated in an upper part, the degree of polarization assumes a value up to 1.0 at a maximum, while the degree of polarization of the diffuse reflection which degree of polarization is illustrated in a lower part is approximately 0.4 at a maximum. Incidentally, the zenith angle θ is in the following relation with respect to each of the degree of polarization $\rho_s$ in the case of the specular reflection and the degree of polarization $\rho_d$ in the case of the diffuse reflection.

[Math. 3]

$$\rho_s = \frac{2\sin^2\theta\cos\theta\sqrt{\eta^2 - \sin^2\theta}}{\eta^2 - \sin^2\theta - \eta^2\sin^2\theta + 2\sin^4\theta} \quad \text{(Equation 3)}$$

$$\rho_d = \frac{(\eta - 1/\eta)^2\sin^2\theta}{2 + 2\eta^2 - (\eta + 1/\eta)^2\sin^2\theta + 4\cos\theta\sqrt{\eta^2 - \sin^2\theta}}$$

Here, η is the index of refraction of an object. The zenith angle θ is obtained by assigning the degree of polarization ρ obtained by Equation 2 to one of $\rho_s$ and $\rho_d$ in Equation 3. A normal vector ($p_x$, $p_y$, $p_z$) is obtained as follows on the basis of the azimuth angle α and the zenith angle θ thus obtained.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix} \quad \text{(Equation 4)}$$

Figure 5:
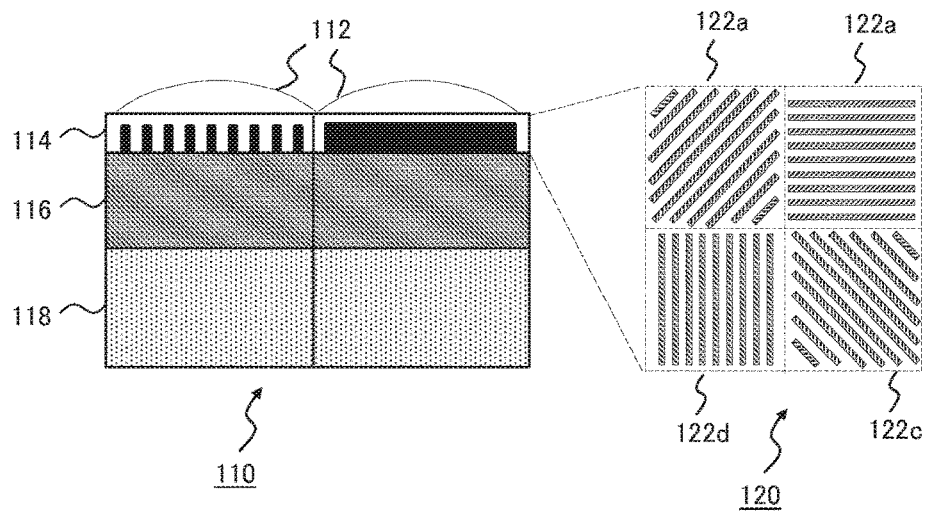
FIG. 5 is a diagram illustrating a structure example of an imaging element including a polarizer layer, which imaging element can be introduced into an imaging device according to the present embodiment.

Incidentally, in the present embodiment, means for observing the polarized light luminance is not limited to the linear polarizing plate. For example, a layer of polarizers may be provided as a part of an imaging element structure. FIG. 5 depicts a structure example of an imaging element including a polarizer layer, which imaging element can be introduced into the imaging device 12 according to the present embodiment. Incidentally, the figure schematically depicts a functional structure in section of the element but does not depict a detailed structure of an interlayer insulating film, wiring, and the like. The imaging element 110 includes a microlens layer 112, a wire grid polarizer layer 114, a color filter layer 116, and a light detecting layer 118.

The wire grid polarizer layer 114 includes polarizers in which a plurality of linear conductor members are arranged in a stripe manner at intervals smaller than the wavelength of the incident light. When light condensed by the microlens layer 112 enters the wire grid polarizer layer 114, a polarized light component in a direction parallel with polarizer lines is reflected, and only a polarized light component perpendicular to the polarizer lines is transmitted. A polarized light image is obtained by detecting the transmitted polarized light component by the light detecting layer 118. The light detecting layer 118 has a semiconductor element structure of an ordinary CCD (Charge Coupled Device) image sensor, an ordinary CMOS (Complementary Metal Oxide Semiconductor) image sensor, or the like.

The wire grid polarizer layer 114 includes an arrangement of polarizers such that transmitting polarization directions are different in charge reading units in the light detecting layer 118, i.e., pixel units, or larger units. A right side of the figure illustrates a polarizer arrangement 120 when the wire grid polarizer layer 114 is viewed from an upper surface. Shaded lines in the figure are conductors (wires) constituting the polarizers. Incidentally, rectangles of dotted lines each represent a region of a polarizer in one direction, and the dotted lines themselves are not actually formed.

In the illustrated example, polarizers in four directions are arranged in four regions 122a, 122b, 122c, and 122d in two rows and two columns. In the figure, polarizers located on a diagonal line have transmitting directions orthogonal to each other, and polarizers adjacent to each other have a difference of 45°. That is, polarizers in four directions at intervals of 45° are provided. This substitutes for the linear polarizing plate 70. In the light detecting layer 118 disposed below, polarized light information in four directions at intervals of 45° can be obtained in respective regions corresponding to the four regions 122a, 122b, 122c, and 122d. An image sensor that simultaneously obtains the polarized light information in the four directions as two-dimensional data can be implemented by further arranging a predetermined number of such polarizer arrangements in a vertical direction and a horizontal direction and connecting a peripheral circuit that controls charge readout timing.

The imaging element 110 illustrated in the figure is provided with the color filter layer 116 between the wire grid polarizer layer 114 and the light detecting layer 118. The color filter layer 116, for example, includes an arrangement of filters that respectively transmit light of red, green, and blue in correspondence with respective pixels. Polarized light information is thereby obtained on a color-by-color basis according to a combination of the directions of the polarizers in the wire grid polarizer layer 114 located on an upper side and the colors of the filters in the color filter layer 116 located on a lower side. That is, because polarized light information in the same direction and the same color is discretely obtained on the image plane, polarized light images in respective directions and respective colors are obtained by interpolating the polarized light information as appropriate.

In addition, an unpolarized color image can also be reproduced by performing operation between polarized light images in the same color. An image obtaining technology using wire grid polarizers is also disclosed in, for example, Japanese Patent Laid-Open No. 2012-80065 or the like. However, in the present embodiment, polarized light luminance images are basically used, and thus, the color filter layer 116 can be omitted when color images are not necessary for other purposes. In addition, the polarizers are not limited to the wire grid type, and linear dichroic polarizers or the like can also be used.

Figure 6:
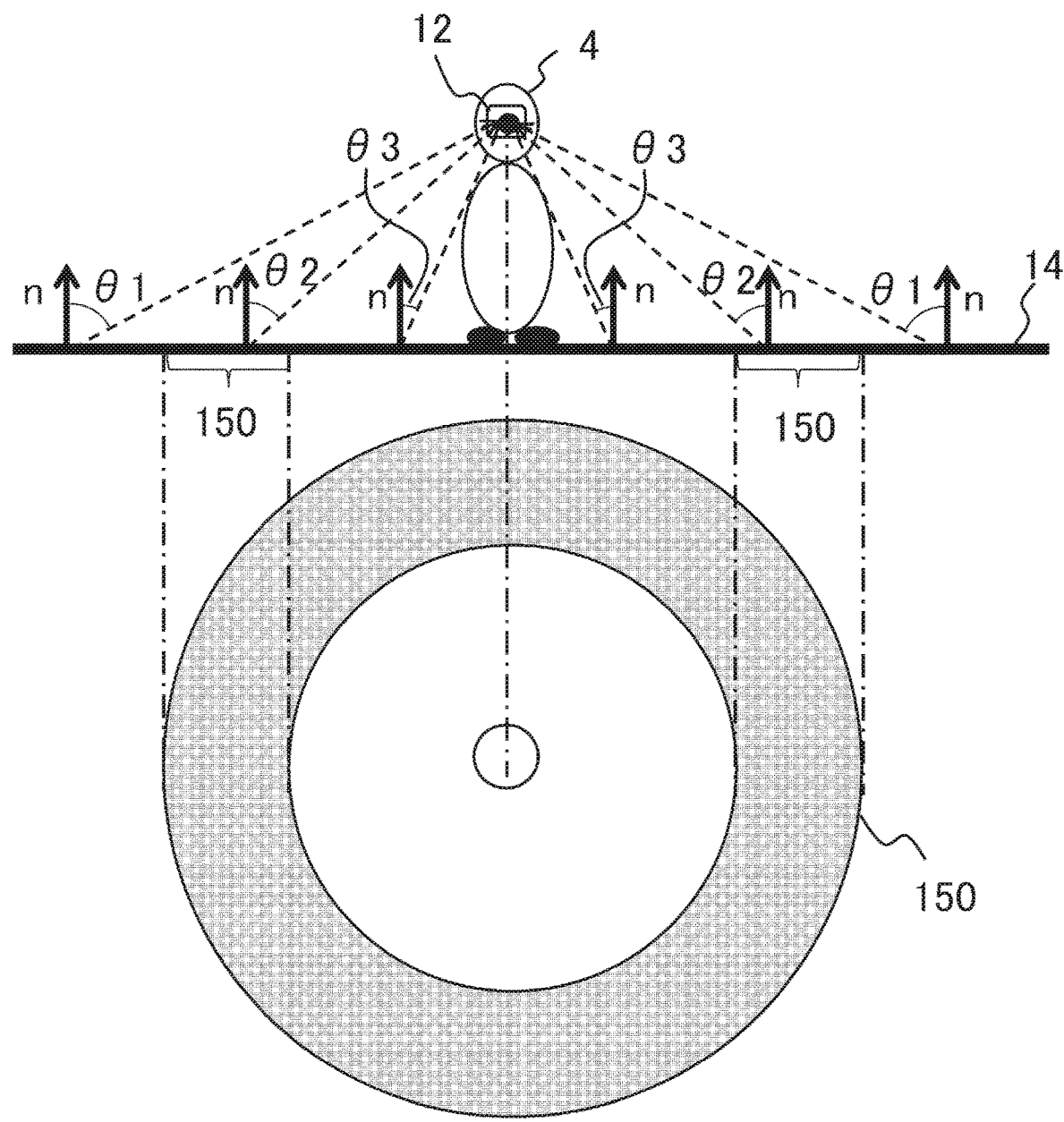
FIG. 6 is a diagram of assistance in explaining a principle in which an information processing apparatus in the present embodiment detects the peripheral edge of a planar play field on the basis of the shape of a region in which high degrees of polarization are obtained.
Figure 7:
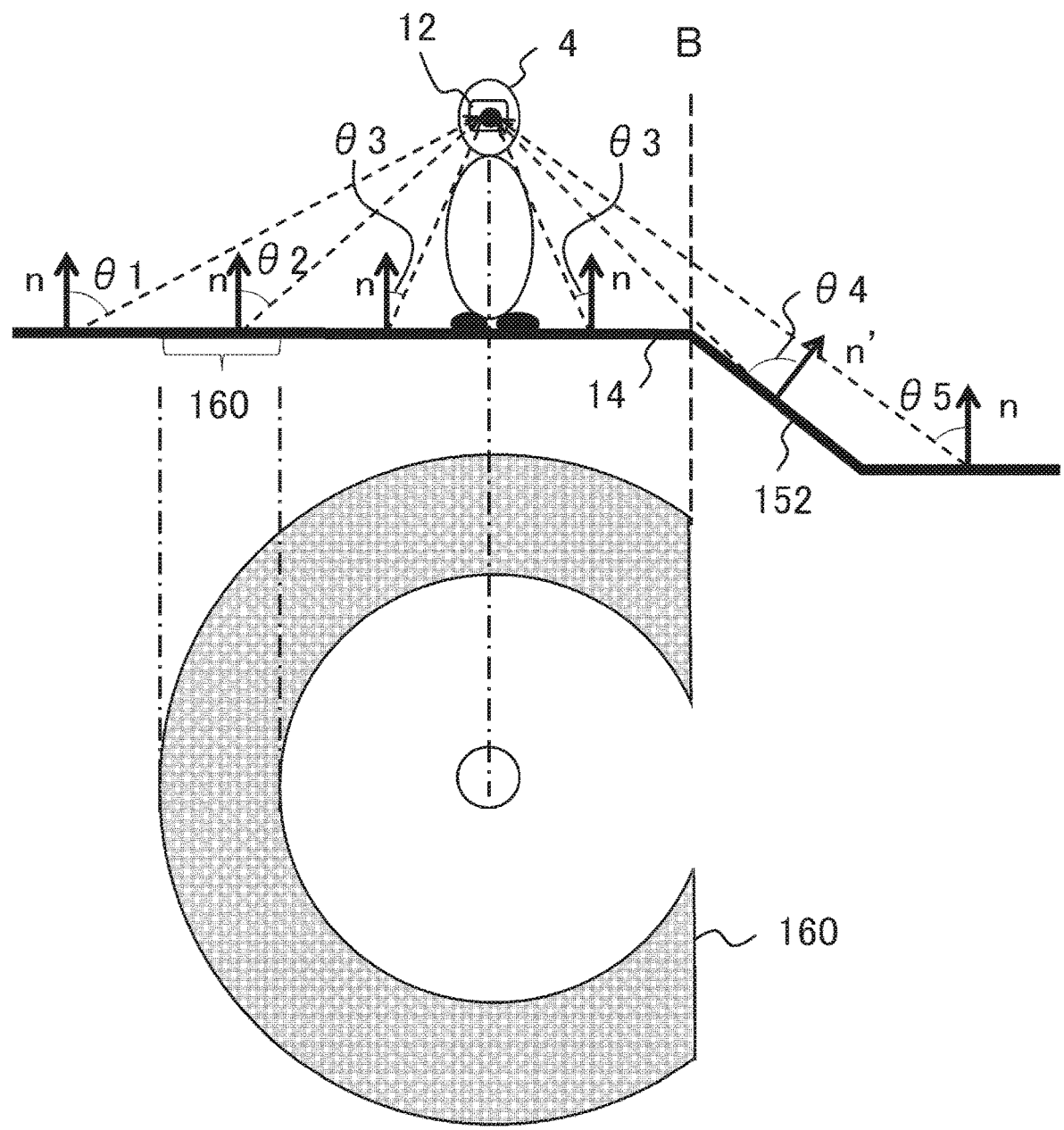
FIG. 7 is a diagram of assistance in explaining the principle in which the information processing apparatus in the present embodiment detects the peripheral edge of a planar play field on the basis of the shape of a region in which high degrees of polarization are obtained.

FIGS. 6 and 7 are diagrams of assistance in explaining a principle in which the information processing apparatus 10 in the present embodiment detects the peripheral edge of the planar play field 14 on the basis of the shape of a region in which high degrees of polarization are obtained. An upper part of FIG. 6 depicts a state in which the robot 4 is present on the play field 14 as viewed from a side. As described above, the play field 14 constitutes at least a flat surface as a necessary condition. Therefore, the normal vector n on the play field 14 is vertically upward irrespective of the position of the normal vector n.

The zenith angle θ of the normal vector n at each position is an angle formed between a light ray reaching the imaging device 12 mounted on the robot 4 and the normal vector n. Thus, between a distance d from the robot 4 and the zenith angle θ, a relation of d=H tan θ holds, where H is the height of the imaging device 12. That is, the larger the distance d, the larger the zenith angle θ. In the illustrated example, a zenith angle θ1 at a most distant position, a zenith angle θ2 at an intermediate position, and a zenith angle θ3 at a most adjacent position have a relation of θ1>θ2>θ3.

On the other hand, in a case where the play field 14 has a material that makes specular reflection dominant, zenith angles at which a high degree of polarization is obtained are in a range of approximately 0.6 to 1.3 rad, as illustrated in the upper part of FIG. 4. In a case of glass, for example, a Brewster angle at which the reflectance of p-polarized light is zero and completely polarized light of only an s-polarized light component is obtained is approximately 56° (0.98 rad). Hence, as illustrated in FIG. 4, when a threshold value ρth is set for the degree of polarization and a region on the play field 14 which region has degrees of polarization higher than the threshold value ρth is extracted as a high polarization degree region 150, the region is in a circumferential shape having a width with the robot 4 as a center in a state in which the region is overlooked from a viewpoint directly above the robot 4, as illustrated in a lower part of FIG. 6.

On the other hand, consideration will be given to a case where there is a level difference in the vicinity of the robot 4, as illustrated in FIG. 7. Specifically, as illustrated in a side view in an upper part, a position B is the peripheral edge of the play field 14, and a slope 152 is present on the outside of the peripheral edge of the play field 14. A normal vector n' on the slope 152 has a direction different from that of the normal vector n in the play field 14. Thus, a discontinuous region in which a change in the zenith angle θ with respect to the distance d from the robot 4 does not satisfy d=H tan θ is generated, and a high polarization degree region 160 is not in a circumferential shape.

In the illustrated example, a zenith angle θ4 of the normal vector n' is close to 90° in a region of the slope 152, and thus the region of the slope 152 is excluded from the high polarization degree region. In a more outward region without a slope, the normal vector n is in the same direction as the play field 14. However, because of a large distance from the robot 4 to the more outward region, a zenith angle θ5 is large, and the more outward region is not included in the high polarization degree region either. As a result, the high polarization degree region 160 in this case has a shape in which a part of the circumference is missing. While the figure illustrates a case where the slope 152 is present on the outside of the peripheral edge, the same is true for cases where a surface is discontinued as at an edge of a table or the like and where there is a wall.

The information processing apparatus 10 detects the position B of the peripheral edge of the play field 14 on the basis of the missing part and controls the robot 4 so that the robot 4 does not go beyond the peripheral edge of the play field 14. Incidentally, in reality, only a further limited part of the high polarization degree region 160 may be obtained due to a field of view of the imaging device 12. However, when the imaging device 12 is provided so as to perform photographing in the traveling direction of the robot 4, it is possible to detect the missing part in the traveling direction, or in turn the peripheral edge of the play field 14. In addition, in the photographed image, the high polarization degree region 160 appears in a perspectively projected shape. However, a shape in an overlooked state is obtained easily by coordinate transformation used in computer graphics.

That is, a bird's-eye view as illustrated in the figure is obtained when an image on the image plane is once back projected onto the play field 14 in a three-dimensional space on the basis of a positional relation between the imaging device 12 and the surface of the play field 14 and the play field 14 is projected into an overlooking camera coordinate system. The degree of polarization is a parameter independent of color information and is thus not affected even when the play field 14 is an object of a material having a high light ray transmittance such as glass or acrylic resin.

When the robot 4 is made to walk on a glass table, for example, no distinction may be made between the floor and the table on the basis of a color image alone, and the robot 4 may, for example, fall to the floor as a result of failing to recognize an edge of the table. Even when the table and the floor have the same color, a similar case may occur depending on the state of ambient light. The present embodiment is based on the degree of polarization and introduces a simple criterion, that is, the shape of the high polarization degree region. Thus, the present embodiment can detect the peripheral edge of the play field 14 with ease and high robustness as compared with ordinary object detection using a color image, and can thus ensure the safety of the robot 4 or the user.

Figure 8:
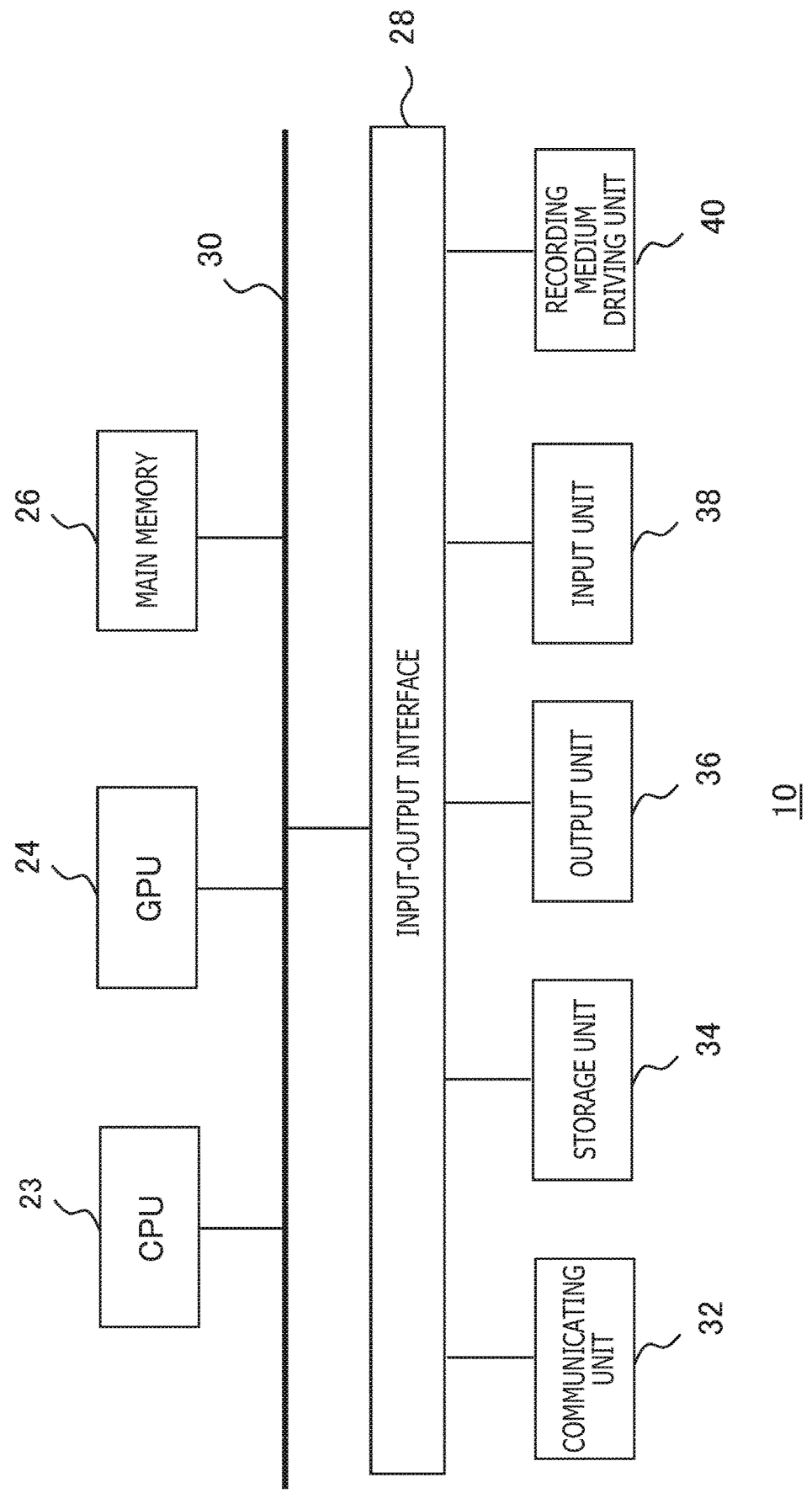
FIG. 8 is a diagram illustrating an internal circuit configuration of the information processing apparatus in the present embodiment.

FIG. 8 depicts an internal circuit configuration of the information processing apparatus 10. The information processing apparatus 10 includes a CPU (Central Processing Unit) 23, a GPU (Graphics Processing Unit) 24, and a main memory 26. These parts are interconnected via a bus 30. The bus 30 is further connected with an input-output interface 28. The input-output interface 28 is connected with a communicating unit 32 including a peripheral device interface such as USB (Universal Serial Bus) or IEEE (Institute of Electrical and Electronics Engineers) 1394 and a network interface of a wired or wireless LAN (Local Area Network); a storage unit 34 such as a hard disk drive or a nonvolatile memory; an output unit 36 that outputs data to a control mechanism of the robot 4, a display device not illustrated, or the like; an input unit 38 that inputs data from the imaging device 12 and an input device not illustrated; and a recording medium driving unit 40 that drives a removable recording medium such as a magnetic disk, an optical disk, or a semiconductor memory.

The CPU 23 controls the whole of the information processing apparatus 10 by executing an operating system stored in the storage unit 34. The CPU 23 also executes various kinds of programs read from the removable recording medium and loaded into the main memory 26 or downloaded via the communicating unit 32. The GPU 24 has functions of a geometry engine and functions of a rendering processor. The GPU 24 performs rendering processing according to a rendering instruction from the CPU 23 and stores the data of a display image in a frame buffer not illustrated.

Then, the display image stored in the frame buffer is converted into a video signal, and the video signal is output to the output unit 36. The main memory 26 is formed by a RAM (Random Access Memory). The main memory 26 stores a program and data necessary for processing. Incidentally, as described above, various applications are possible for the present embodiment. Thus, a part of the configuration illustrated in the figure may be omitted or replaced with another circuit depending on an output form of a processing result according to an application.

Figure 9:
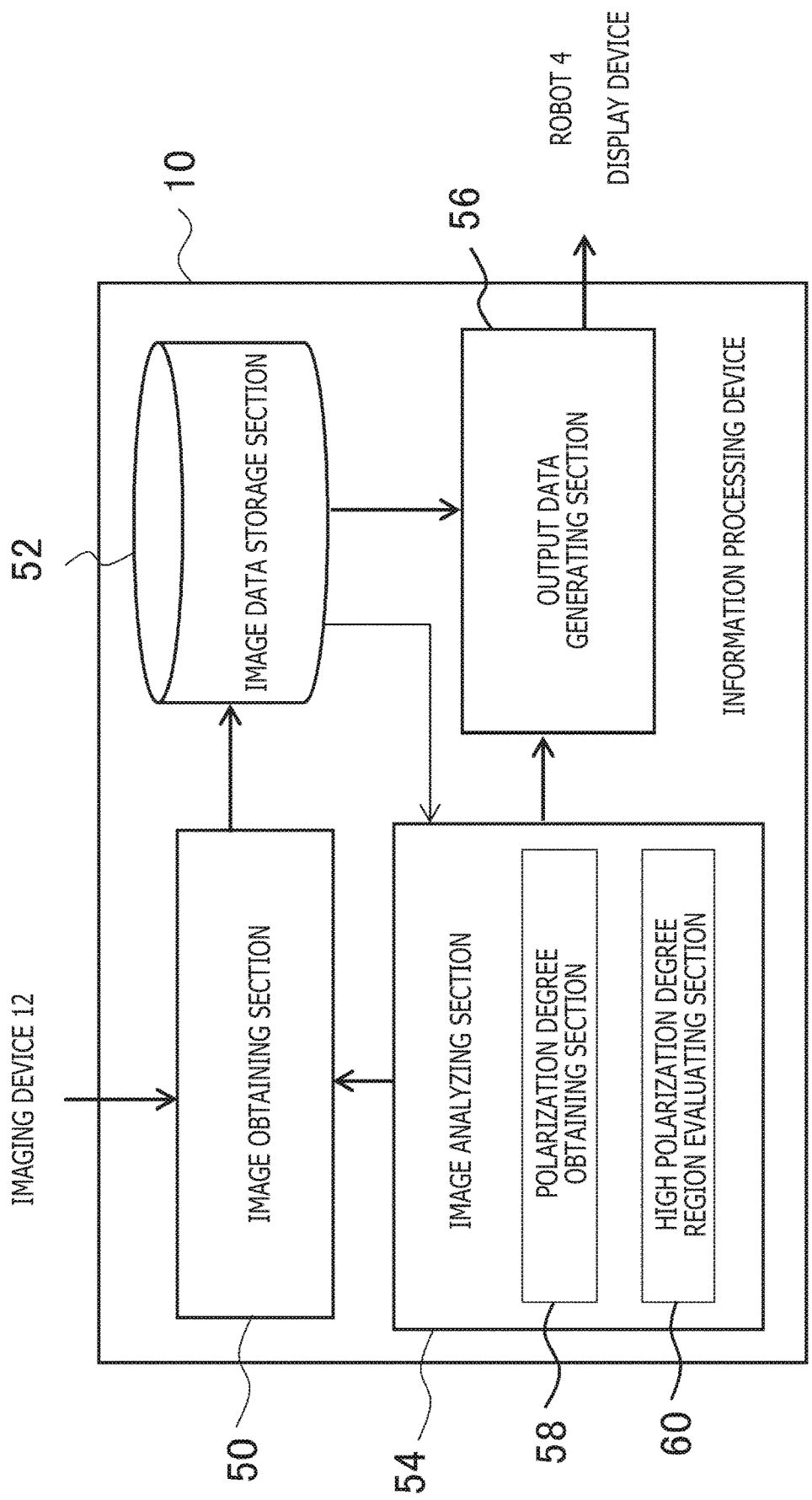
FIG. 9 is a diagram illustrating a configuration of functional blocks of the information processing apparatus in the present embodiment.

FIG. 9 depicts a configuration of functional blocks of the information processing apparatus 10 in the present embodiment. Elements described as functional blocks performing various kinds of processing in the figure can be constituted by main circuits such as the CPU 23, the GPU 24, and the main memory 26 illustrated in FIG. 8 in terms of hardware, and are implemented by a program loaded from a recording medium driven by the recording medium driving unit 40 or the storage unit 34 into the main memory 26 or the like in terms of software. Hence, it is to be understood by those skilled in the art that these functional blocks can be implemented in various forms by only hardware, only software, or combinations of hardware and software and are not to be limited to one of the forms.

The information processing apparatus 10 includes an image obtaining section 50 that obtains data of a photographed image from the imaging device 12; an image data storage section 52 that stores the obtained data of the image; an image analyzing section 54 that performs image analysis including detection of the peripheral edge of the play field; and an output data generating section 56 that generates data to be output, by using a result of the analysis.

The image obtaining section 50 is implemented by the input unit 38, the CPU 23, and the like in FIG. 8. The image obtaining section 50 obtains the data of a photographed image including a polarized light image from the imaging device 12. At this time, at least the data of polarized light images in three directions corresponding to the transmission axis in three directions is obtained as the polarized light image. The polarized light images may be photographed each time the linear polarizing plate 70 disposed in front of the imaging device 12 is rotated, as illustrated in FIG. 2, and stopped in a predetermined direction, or may be photographed by introducing an image sensor including an imaging element of the structure illustrated in FIG. 5. In the latter case, polarized light images in a plurality of directions can be obtained by performing photographing once.

The image obtaining section 50 may further obtain the data of an ordinary photographed color image, depending on the objective of information processing or the content of image analysis as in a case where the photographed image is used in the output display image or the like. In addition, in a case where the imaging device 12 is a stereo camera including two cameras arranged at known intervals, the image obtaining section 50 may obtain the data of a stereo image having a left-right parallax, the stereo image being photographed by the cameras. The image obtaining section 50 sequentially stores the data of the obtained photographed image in the image data storage section 52.

The image analyzing section 54 is implemented by the CPU 23, the GPU 24, and the like in FIG. 8. The image analyzing section 54 performs image analysis by using the data stored in the image data storage section 52. More specifically, the image analyzing section 54 includes a polarization degree obtaining section 58 and a high polarization degree region evaluating section 60. The polarization degree obtaining section 58 derives a degree of polarization by using a change in polarized light luminance with respect to a change in direction as described above. Specifically, first, luminance is extracted for each of corresponding pixels of polarized light images in a plurality of directions, and changes in luminance with respect to the polarization directions are derived.

When there are polarized light images in three directions $\varphi 1$, $\varphi 2$, and $\varphi 3$, a continuous function as illustrated in FIG.

3 is obtained by approximating a curve passing through three points at coordinates ($\varphi 1$, I1), ($\varphi 2$, I2), and ($\varphi 3$, I3) of these polarized light images into the function of Equation 1 with a least-square method or the like. A degree of polarization ρ is obtained by substituting a maximum luminance $I_{max}$ and a minimum luminance $I_{min}$ thus obtained into Equation 2. When this processing is repeated for each pixel, distribution of degrees of polarization is obtained for the image plane. Incidentally, in a case where only the detection of the peripheral edge of the play field 14 is performed by image analysis, the calculation of the degrees of polarization may be limited to only a region in a predetermined range of an image of the play field 14 and the vicinity thereof.

Normally, the play field 14 is on the lower side of a field of view. Thus, a lower half region of the photographed image, for example, may be set as a polarization degree operation target. In a case where the posture of the imaging device 12 can be obtained separately by an acceleration sensor or the like, the operation target region may be adjusted on the basis of information regarding the posture. The high polarization degree region evaluating section 60 extracts a region on the image plane in which region degrees of polarization higher than a threshold value set in advance are obtained, and evaluates the shape of the high polarization degree region when the high polarization degree region is overlooked. At this time, as described above, ordinary viewpoint transformation processing is performed in computer graphics.

Due to the field of view of the imaging device 12, the high polarization degree region is basically a part of a circumference. A portion parted by the field of view is clear on the basis of positions on the image plane. Hence, the high polarization degree region evaluating section 60 determines whether or not there is another missing part, that is, a missing part in an arc shape corresponding to an angle of view. The presence or absence of the loss can be determined by, for example, preparing a template image of the arc shape in advance and obtaining a difference by pattern matching. Then, when there is a missing part, information indicating that the peripheral edge of the play field 14 is near is supplied to the output data generating section 56 together with information regarding a direction, a distance, a shape, and the like thereof.

Incidentally, when the robot 4 moves or changes the direction, the imaging device 12 can photograph images in various fields of view. Using this, the high polarization degree region evaluating section 60 may create an environment map on which the range of the play field 14 is indicated in a two-dimensional or three-dimensional unified coordinate system, by accumulating and recording the position of the imaging device 12 when each photographed image is obtained and the shape of the high polarization degree region obtained at the position.

When the range of the play field 14 can once be defined as a result of determining the peripheral edge by obtaining or interpolating the peripheral edge in all directions, positional relation between the robot 4 and the peripheral edge can thereafter be grasped without the evaluation based on the degrees of polarization being performed. In addition to the above-described processing, the image analyzing section 54 may perform ordinary image analysis processing such as obtainment of the normal vector of an object present in the vicinity of the robot 4. The position and posture of the object may be determined accurately by, for example, identifying the position of the object with use of a stereo image and integrating the position of the object with information regarding the normal vector.

The output data generating section 56 is implemented by the CPU 23, the GPU 24, the output unit 36, and the like in FIG. 8. The output data generating section 56 generates a control signal to the robot or data to be output such as an image or sound to be presented to the user or the like on the basis of the information identified by the image analyzing section 54, and outputs the control signal or the data. Basically, when the peripheral edge of the play field 14 is approaching in the traveling direction, a control signal for changing direction is transmitted to the robot 4. Alternatively, the data of a display image or sound warning the user that the peripheral edge of the play field 14 is approaching is transmitted to the display device of the head-mounted display or the like.

When the peripheral edge of the play field 14 is not approaching, the output data generating section 56 performs original information processing and outputs a control signal or the data of a display image. The content of the information processing performed at this time and the kind of the output data are not particularly limited. For example, a control signal for the robot to lift an object present in the vicinity thereof or slip through objects present in the vicinity thereof to walk is generated and transmitted to the robot. Alternatively, an image representing augmented reality or virtual reality in a field of view corresponding to the line of sight of the user wearing the head-mounted display may be generated and transmitted to the head-mounted display. In these pieces of processing, the data of the photographed image stored in the image data storage section 52 and a result of object detection by the image analyzing section 54 may be used as appropriate.

Figure 10:
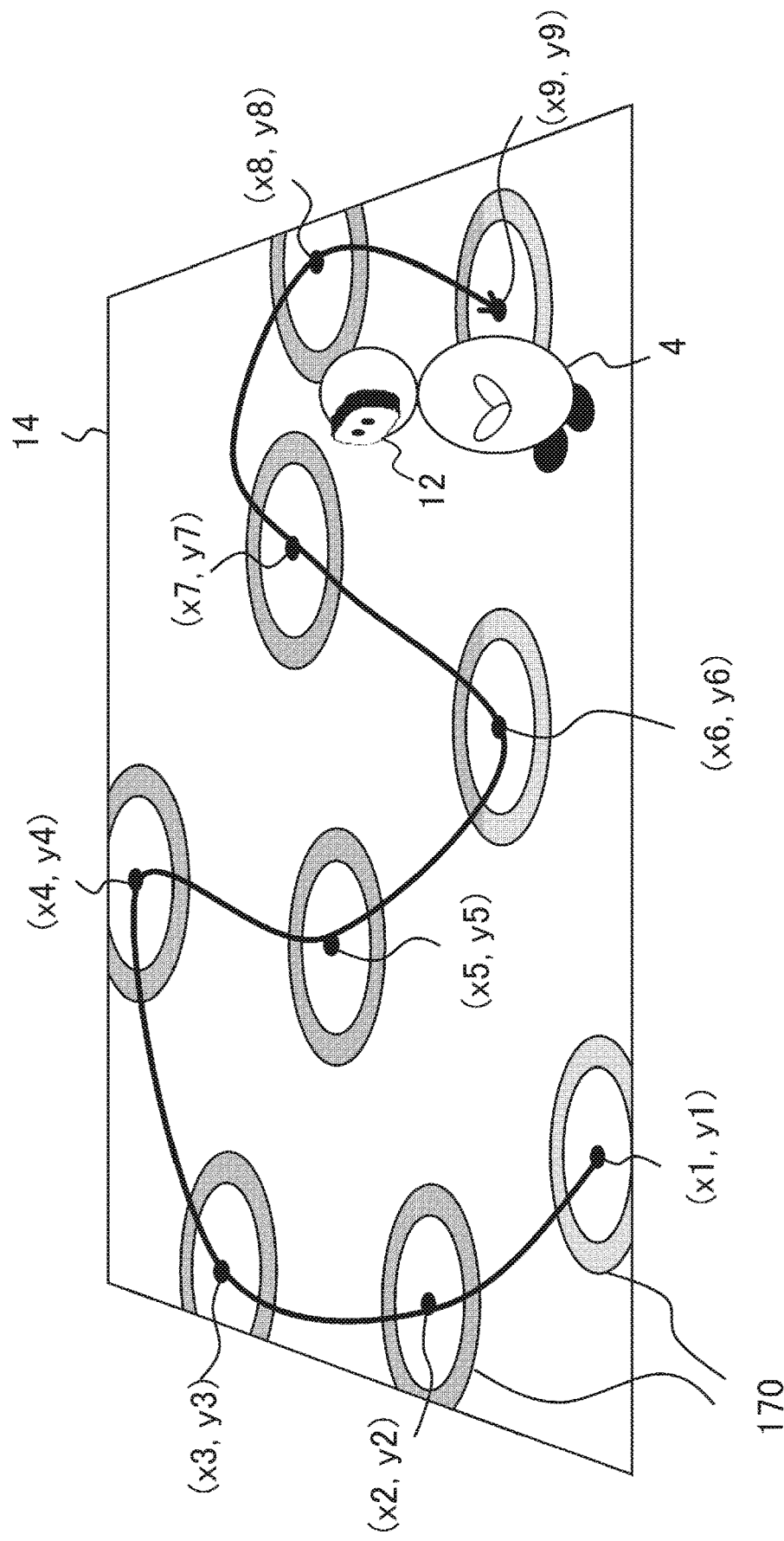
FIG. 10 is a diagram schematically illustrating temporal changes in a high polarization degree region evaluated by a high polarization degree region evaluating section in the present embodiment.

FIG. 10 schematically depicts temporal changes in the high polarization degree region evaluated by the high polarization degree region evaluating section 60. When the imaging device 12 continues photographing at a predetermined frequency in a state in which the robot 4 is moving, the high polarization degree region is obtained at a plurality of positions of the play field 14. In the illustrated example, high polarization degree regions (for example, high polarization degree regions 170) are each obtained at timings when the robot 4 is present at position coordinates (x1, y1), (x2, y2), . . . (x9, y9).

In actuality, however, the high polarization degree region may be obtained at a higher frequency. In addition, only a part of the high polarization degree region which part is included in the field of view of the imaging device 12 is obtained by one time of photographing, as described above. For example, when the robot 4 is moving to the peripheral edge side of the play field 14 at a timing when the robot 4 is present at (x2, y2), a missing part in the high polarization degree region is generated by photographing in that direction. The robot 4 can be prevented from deviating from the play field 14 by making the robot 4 change the direction accordingly.

On the other hand, in a case where the position coordinates (x1, y1), (x2, y2), . . . (x9, y9) and the orientation of the imaging device 12 can be obtained by a sensor included in the robot 4, an imaging device externally photographing the robot 4, or the like, the range of the play field 14 can be obtained by accumulating and storing the shape of the high polarization degree region obtained at each position. That is, as illustrated in the figure, when the high polarization degree regions are represented so as to be superimposed on position coordinates in the unified coordinate system, a union of the high polarization degree regions represents the range of the play field 14.

Figure 11:
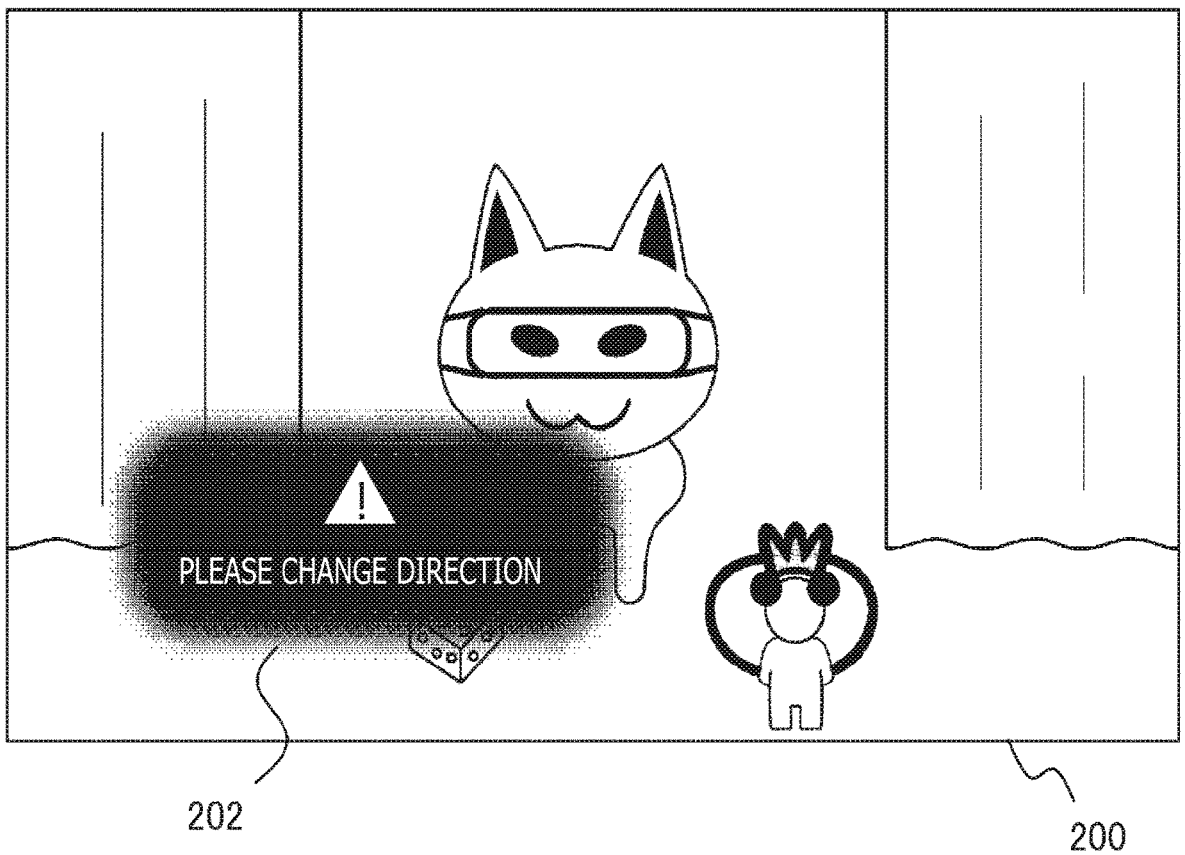
FIG. 11 is a diagram illustrating a screen displayed when a user wearing a head-mounted display is warned of deviation from the play field in the present embodiment.

FIG. 11 illustrates a screen displayed when, in place of the robot 4, the user wearing the head-mounted display is warned of deviation from the play field 14. A display screen 200 has a configuration obtained by superimposed display of a warning image 202 on an image of content such as a virtual world. When the high polarization degree region evaluating section 60 detects a missing part in the high polarization degree region in the traveling direction of the user, the high polarization degree region evaluating section 60 makes superimposed display of the warning image 202 via the output data generating section 56. In the illustrated example, character information which reads "please change direction" is displayed. However, the content of the warning is not limited to this, and a desirable moving direction may be indicated or illustrated by a figure. Alternatively, a change that necessitates a change of direction may be given to the image itself of the content.

Figure 12:
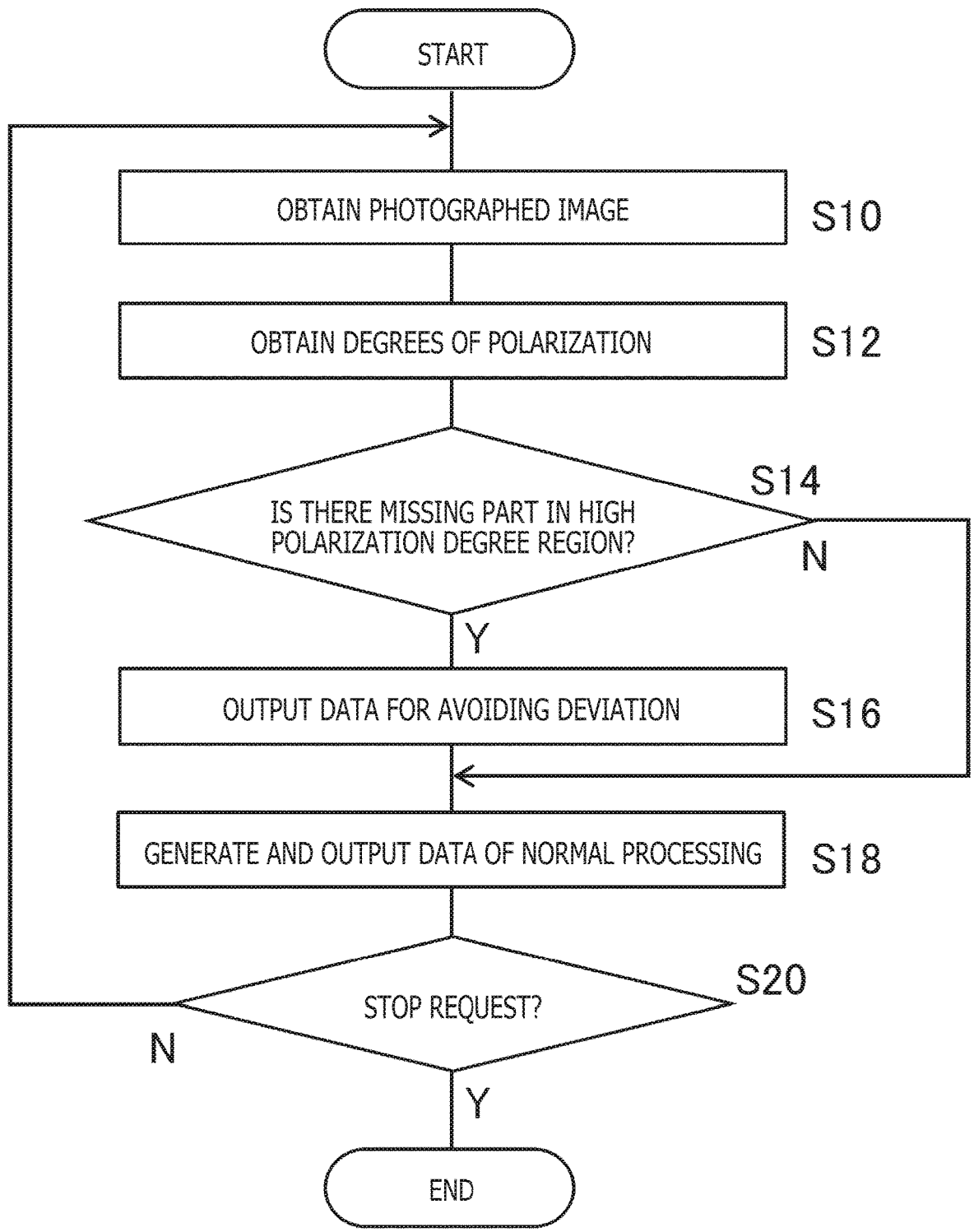
FIG. 12 is a flowchart illustrating a procedure of processing in which the information processing apparatus performs information processing while making a robot or the like avoid deviation from the play field in the present embodiment.

Operation that can be implemented by the configuration described above will next be described. FIG. 12 is a flowchart illustrating a procedure of processing in which the information processing apparatus 10 performs information processing while making the robot 4 or the like avoid deviation from the play field. This flowchart is started in a state in which the imaging device 12 is photographing an image of a photographing target space including polarized light images. First, the image obtaining section 50 of the information processing apparatus 10 obtains the data of the photographed image including the polarized light images (S10). Then, the polarization degree obtaining section 58 of the image analyzing section 54 obtains distribution of degrees of polarization, by using the polarized light images (S12). As described above, the degrees of polarization may be obtained with the image plane narrowed down to a region in which the play field 14 is highly likely to be photographed.

Then, the high polarization degree region evaluating section 60 extracts a region in which degrees of polarization higher than the threshold value are obtained, and obtains the shape of the high polarization degree region when the high polarization degree region is overlooked, by performing viewpoint transformation. Then, when there is a missing part in the arc shape in a visual field range (Y in S14), data for avoiding deviation from the play field 14 is output via the output data generating section 56 (S16). For example, a control signal to change direction is transmitted to the robot 4. Alternatively, a warning image for giving an instruction to change direction is superimposed on the image of the content or the like and transmitted to the display device of the head-mounted display or the like.

Sound indicating a warning may be transmitted to the head-mounted display, a speaker not illustrated, or the like. Alternatively, the warning may be indicated by vibration, by transmitting a control signal that vibrates a vibrator included in a controller held by the user or the head-mounted display worn by the user. The warning of the deviation may be given by outputting one of an image, sound, and vibration or a combination of two or more thereof from an output device in a form recognizable by the user as described above.

When there is no missing part in the high polarization degree region (N in S14), data resulting from normal processing such as a control signal according to an original purpose or a display image or sound of electronic content is generated and output (S18). When there is no need to stop the processing due to a request from the user or the like (N in S20), the processing from S10 to S18 is repeated. All of the processing is ended as a need to stop the processing arises (Yin S20).

According to the present embodiment described above, the imaging device provided to the robot capable of free movement or the head-mounted display worn by the user photographs the polarized light images. Then, when, as viewed from a photographing viewpoint, there is a missing part in the shape of a region in which the degree of polarization is higher than the threshold value when the region is overlooked, it is determined that normal vectors are not uniform, that is, that a non-flat part is present within the angle of view. Then, a control signal to change direction is transmitted to the robot, or a warning image for giving an instruction to change direction is displayed on the head-mounted display.

It is thus possible to prevent dropping from the play field or toppling over as a result of continuing movement while failing to recognize a level difference or an edge of a surface. The present embodiment uses the degree of polarization independent of color information, and thus accurately detects the peripheral edge part of a transparent surface of glass or the like or a surface of a color difficult to distinguish from those of surrounding objects. In addition, there is less effect of an error resulting from operation or the like because determination can be made by a simple criterion of whether or not there is a missing part in the arc shape. As a result, safety can be improved easily for free movement of the moving body such as the robot or the user.

The present invention has been described above on the basis of the embodiment thereof. The foregoing embodiment is illustrative, and it is to be understood by those skilled in the art that combinations of constituent elements and processing processes of the embodiment are susceptible of various modifications and that such modifications also fall within the scope of the present invention.

For example, the present embodiment detects the peripheral edge of the play field by using an effect of a shape change from a flat surface on the shape of the high polarization degree region. In this case, when a flat surface of the same material whose polarization state does not change continues, the flat surface is regarded as the play field. On the other hand, when the fact that a change in the material changes the polarization state and affects the shape of the high polarization degree region is used, the range of the play field can be limited even on the same flat surface. For example, as illustrated in FIG. 4, the degree of polarization of diffuse reflection is low as compared with specular reflection, irrespective of the zenith angle.

Hence, when, for example, the play field is set to be a mat or a flat board of a material that makes a specular reflection component dominant, and is laid on a surface of a material that makes diffuse reflection dominant, the high polarization degree region is missing outside the play field even on the same flat surface. It is thus possible to set the movable range of the moving body in various manners. For example, it is possible to obtain various effects other than safety by, for example, imparting game characteristics to the shape itself of the play field or preventing the robot or the user from going off the photographing angle of view in a mode in which the robot or the user is externally photographed and tracked.

REFERENCE SIGNS LIST

10 Information processing apparatus, 12 Imaging device, 23 CPU, 24 GPU, 26 Main memory, 50 Image obtaining section, 52 Image data storage section, 54 Image analyzing section, 56 Output data generating section, 58 Polarization degree obtaining section, 60 High polarization degree region evaluating section

INDUSTRIAL APPLICABILITY

As described above, the present invention is applicable to various kinds of information processing apparatuses and systems such as a robot control device and an electronic content processing device.

The invention claimed is:

1. An information processing apparatus comprising:
an image obtaining section configured to obtain data of polarized light images in a plurality of directions, the polarized light images being photographed by an imaging device provided to a moving body;
a polarization degree obtaining section configured to obtain distribution of degrees of polarization by using the polarized light images;
a high polarization degree region evaluating section configured to detect a peripheral edge of a play field on which the moving body is present, by evaluating a shape of a high polarization degree region having degrees of polarization higher than a threshold value in a state in which the high polarization degree region is overlooked from directly above the moving body, where the high polarization degree region evaluating section detects the peripheral edge of the play field by identifying a missing part in an arc shape representing the high polarization degree region and corresponding to an angle of view; and
an output data generating section configured to generate and output output data for avoiding movement to the peripheral edge.

2. The information processing apparatus according to claim 1, wherein the high polarization degree region evaluating section detects a boundary at which a planar shape disappears, as the peripheral edge of the play field, by identifying the missing part generated due to a change in a normal vector.

3. The information processing apparatus according to claim 1, wherein the high polarization degree region evaluating section detects a boundary at which a material changes, as the peripheral edge of the play field, by identifying the missing part generated due to the change in the material.

4. The information processing apparatus according to claim 1, wherein the high polarization degree region evaluating section obtains a range of the play field in a unified coordinate system by accumulating and recording the high polarization degree region obtained at a plurality of positions.

5. The information processing apparatus according to claim 1, wherein the output data generating section transmits, to a robot as the moving body, a control signal for movement to avoid movement to the peripheral edge.

6. The information processing apparatus according to claim 1, wherein the output data generating section transmits data of at least one of an image, sound, and vibration giving a warning to avoid movement to the peripheral edge, to an output device that outputs the data in a form recognizable by a user as the moving body.

7. A play field deviation detecting method performed by an information processing apparatus, the method comprising:
obtaining data of polarized light images in a plurality of directions, the polarized light images being photographed by an imaging device provided to a moving body;
obtaining distribution of degrees of polarization by using the polarized light images;
detecting a peripheral edge of a play field on which the moving body is present, by evaluating a shape of a high polarization degree region having degrees of polarization higher than a threshold value in a state in which the high polarization degree region is overlooked from directly above the moving body, where the detecting includes detecting the peripheral edge of the play field by identifying a missing part in an arc shape representing the high polarization degree region and corresponding to an angle of view; and
generating and outputting output data for avoiding movement to the peripheral edge.

8. A non-transitory, computer readable storage medium containing a computer program, which when executed by a computer, causes the computer to perform a play field deviation detecting method by carrying out actions, comprising:
obtaining data of polarized light images in a plurality of directions, the polarized light images being photographed by an imaging device provided to a moving body;
obtaining distribution of degrees of polarization by using the polarized light images;
detecting a peripheral edge of a play field on which the moving body is present, by evaluating a shape of a high polarization degree region having higher degrees of polarization than a threshold value in a state in which the high polarization degree region is overlooked from directly above the moving body, where the detecting includes detecting the peripheral edge of the play field by identifying a missing part in an arc shape representing the high polarization degree region and corresponding to an angle of view; and
generating and outputting output data for avoiding movement to the peripheral edge.

* * * * *